United States Patent
Lieu et al.

(10) Patent No.: US 11,794,111 B1
(45) Date of Patent: Oct. 24, 2023

(54) INTEGRATED AUGMENTED REALITY GAMING METHOD AND SYSTEM

(71) Applicants: Alex Lieu, South Pasadena, CA (US); Michael Borys, Glendale, CA (US); Susan Bonds, Marietta, GA (US)

(72) Inventors: Alex Lieu, South Pasadena, CA (US); Michael Borys, Glendale, CA (US); Susan Bonds, Marietta, GA (US)

(73) Assignee: Animal Repair Shop, LLC, Burbank, CA (US)

( * ) Notice: Subject to any disclaimer, the term of this patent is extended or adjusted under 35 U.S.C. 154(b) by 0 days.

(21) Appl. No.: 18/115,567

(22) Filed: Feb. 28, 2023

(51) Int. Cl.
  *A63F 13/213* (2014.01)
  *A63F 13/65* (2014.01)
  *A63F 13/69* (2014.01)
  *A63F 13/822* (2014.01)
  *A63F 13/92* (2014.01)
  *A63F 13/798* (2014.01)

(52) U.S. Cl.
  CPC ............ *A63F 13/65* (2014.09); *A63F 13/213* (2014.09); *A63F 13/69* (2014.09); *A63F 13/798* (2014.09); *A63F 13/822* (2014.09); *A63F 13/92* (2014.09); *A63F 2300/8082* (2013.01)

(58) Field of Classification Search
  None
  See application file for complete search history.

(56) References Cited

U.S. PATENT DOCUMENTS

| 2012/0122570 A1* | 5/2012 | Baronoff | A63F 13/792 463/31 |
| 2012/0218298 A1* | 8/2012 | Hayakawa | A63F 13/655 345/633 |

\* cited by examiner

*Primary Examiner* — Damon J Pierce
(74) *Attorney, Agent, or Firm* — Woods Rogers Vandeventer Black; Timothy J. Bechen

(57) ABSTRACT

The present invention provides a method and system for integrating physical items within a computing interaction. This includes executing an application for progressing a storyline via interactions with physical items, the storyline being conditional events generating an interactive series. The method and system includes determining input data relating to an existing event and accessing event output data based at least on the input data, as well as presenting the event output data. The method and system receives visual content data including digital imagery and processing the visual content data in relation to the storyline. This includes electronically determining a next event in the storyline based thereon and generating and displaying an augmented reality output display integrated with the digital imagery of the at least one of the plurality of physical items via the mobile computing device based on the next event.

25 Claims, 8 Drawing Sheets

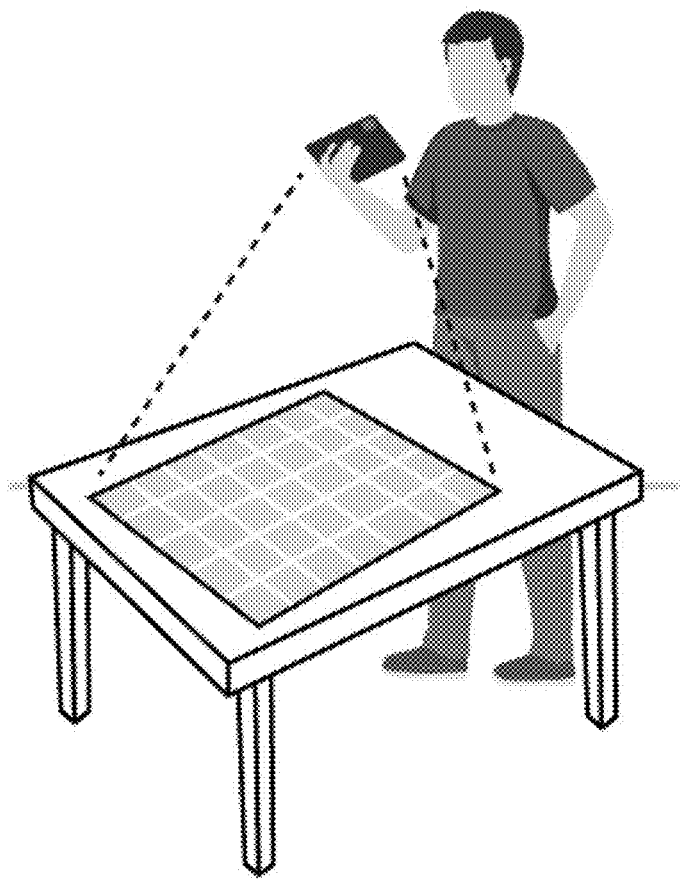
FIG. 7
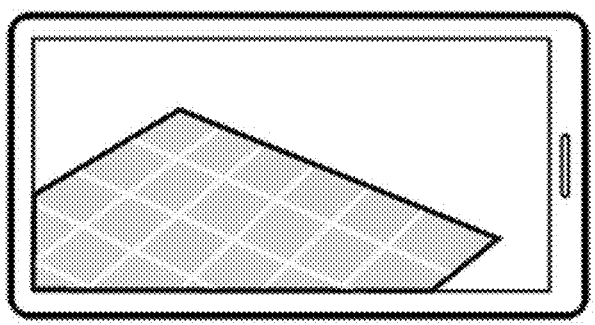
FIG. 8A
FIG. 8B
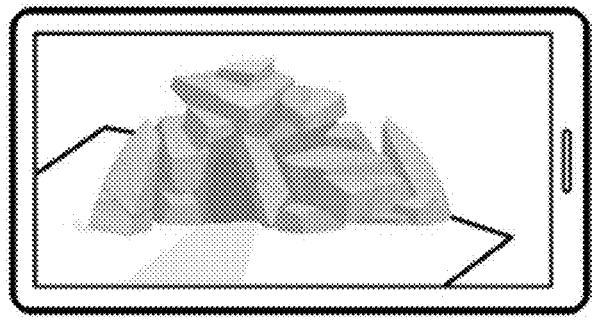

INTEGRATED AUGMENTED REALITY GAMING METHOD AND SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

RELATED APPLICATIONS

There are no related applications.

FIELD OF INVENTION

The present invention relates generally to an interactive gaming method and system and more specifically to integrating physical and virtual gaming with augmented reality and mobile computing devices.

BACKGROUND

There are currently two primary modalities for engaging in gameplay. The first modality is physical, real-world activities. Common examples include playing board games, card games, by way of example. These games range from predefined rule-based games, for example board games like Clue® from Hasbro, to story-driven games with user-generated content, such as Dungeons & Dragons or similar games.

The second modality is computer-based games. Common examples range from computer video games, mobile app games, online or network-based games. Other examples in this modality include virtual reality environments and platforms. This modality is well-known and well established.

Missing is a current gaming solution that integrates or merges both modalities. Existing mobile devices now include functionality for input and output with physical devices, but there fails to exist computing software and gaming solutions that integrate both the physical and electronic interactions.

Limited solutions have been attempted using augmented reality interactions for mobile gameplay. For example, augmented reality interactions were available for Pokemon Go® available from Niantic. This technology used global positioning system (GPS) data integrated with an on-screen display. That gaming option used the GPS data for electronically notifying the user that a particular gaming character may be nearby and available for capture.

None of the existing gaming solutions capture the full scope of gameplay available by merging both modalities, both for story and gameplay content, but also for user engagement and user interaction. As such, there exists a need for a computing method and system that integrates both physical gaming items and activities with mobile computing applications for advancing storylines and interactive gameplay.

BRIEF DESCRIPTION

Users can open a box with physical items and download an app on their smartphone. With physical items from the box and the executable app, users can then engage in augmented reality gameplay not previously technically available.

The physical items can include a game board, but does not have to. Rather, these items can be figurines, printed material, dice, cards, or any other physical items.

Gameplay can be a single user or a group of users. The gameplay can be a stand-alone game or a chapter within a larger storyline. The gameplay can be unique characters or can be complimentary to co-existing story content. For example, the gameplay can be a unique adventure for a character or characters originating from a comic book or related storyline.

Users unbox the pieces and launch the mobile app. Gameplay commences according to specific rules. For example, users select characters and begin to progress through the storyline. Using the mobile app, users can scan one or more physical items. The scanning of the items activates interactions through the mobile device, including augmented reality.

Via the augmented reality display, the gameplay is further enhanced. This can include displaying additional gameplay content for solving puzzles, finding clues, etc.

Based on the physical items, interacting with mobile devices, and augmented reality output, users can progress along the storyline with continued interactions.

The present invention provides a method and system for integrating physical items with computing interactions. The method and system includes executing an application on a mobile computing device, where the application includes executable software instructions for progressing a storyline via interactions with at least one user and physical items external to the mobile computing device. The storyline is a plurality of conditional events relating to input and output operations for generating an interactive series of operations between at least one user and the application. The progression of conditional events is part of the user(s) progression through the storyline.

The method and system further includes determining an existing event within the storyline and accessing event data based on the existing event. This operation can be performed via accessing data storage of output content. An event is a specific occurrence as captured or processed by the mobile computing device for recognition and/or processing. For example, an event can be users solving a puzzle, answering a riddle, performing a task, capturing an image or video content, or any other suitable occurrence quantified within and/or by the mobile computing device.

The method and system includes presenting the event output to the at least one user, the event output including at least one of an audio output and a video output. In the embodiment of using a mobile device, the output can be an audio output via a speaker and/or a video output via display.

The method and system further includes acquiring visual content data via at least one camera associated with the mobile computing device. From there, the method and system includes processing the visual content data in relation to the storyline including accessing a data storage element having at least one conditional data field relating to the visual content capture in relation to the current event.

The method and system includes electronically determining a next event in the storyline based thereon. For example, the next event can be a sequential advancement of the storyline. Therein, the method and system includes generating an augmented reality output display via the mobile computing device based on the next event. Here, the augmented reality output merges both a visual display with the image capture for further advancing the storyline. This storyline advancement integrates physical items with the computing interaction.

In further embodiments, the method and system includes presenting, as the event output, a visual display of a graphical representation of a game board, the graphical representation of the game board based at least in part on an identification of at least one object acquired with the visual content. For example, part of the storyline may relate to a board-type game, recognition or engagement of the board of the board game can be based on the object identification.

In a further embodiment, the method and system may include receiving content creator input relating to the storyline. Content creator input can be received via third-party input sources. The method and system may therein integrate the content creator input with the storyline via additional conditional data fields and store the additional content data fields in the data storage element. The additional input can be part of the storyline, therefore including conditional statements for advancing the storyline via varying interactions.

In one embodiment, the conditional data fields include time-based events and/or user-generated events. Time-based events can be events occurring at a predetermined time, for example events occurring at 12 p.m. Midnight on a select date. User-generated events can be events based on user activities or user conditions.

In one embodiment, the visual content data includes at least one image acquired from a physical item, the at least one image including a visual code embedded therein such that the processing of the visual content capture triggers one or more of the conditional data fields for determining the next event in the storyline. For example, in one embodiment the visual code can be embedded within a printed item, such as a sequence of lines, dashes, or other image elements recognized by an image processing module.

The method and system may additionally operate with a plurality of mobile computing devices. Embodiments can include executing a second application on a second mobile computing device and facilitating communicating between the applications. Therein, the method and system can include generating the next event for execution on the second mobile computing device.

When using multiple devices, the method and system can include handing off execution of the storyline from the first computing device to the second computing device. In another embodiment, the method and system may synchronize execution of the storyline via both the first computing device and the second computing device. Wherein, in one embodiment, the first computing device executes the first application and the storyline via a first user perspective and the second computing device executes the second application and the storyline via a second user perspective.

In another embodiment, the method and system can operate outside of a wireless communication network or with limited network connectivity. The method and system can include transmitting at least one mobile storyline module to the mobile computing device and processing additional visual content capture in relation to the at least one mobile storyline module, wherein the mobile computing device is not in wireless communication with a network-based computing server.

In addition to processing a storyline, in one embodiment a next event in the storyline can includes unlocking additional storyline modules. Storyline modules may include separate or addendum storylines complimentary to existing storyline(s).

In one embodiment, the method and system may include generating gameplay statistics based on the execution of the application on the mobile computing device. The gameplay statistics can relate to varying aspect of content gameplay. Therein, this embodiment may additionally include generating an output display of the gameplay statistics for the at least one user.

In one embodiment, a replacement or supplemental physical item can be integrated into the storyline and interaction. Here, the visual content capture anticipates an image of a first physical item and the method and system includes receiving an input command that the first physical item is not available for capturing an image thereof. The method and system includes receiving a second image of a second physical item and instructing the application on the mobile computing device for treating the second physical item as equivalent of the first physical item.

In one embodiment, the user engagement of the mobile device and/or engaging in the storyline activities can be made part of the interaction itself. The method and system can include receiving a video recording of the at least first user interacting with the output based on the next event and then integrating the video recording with a graphical representation of the output based on the next event.

The method and system overcomes the limitations of prior gaming techniques by merging software and real-world physical objects to generate computing gameplay interactions.

BRIEF DESCRIPTION OF THE DRAWINGS

FIG. 7 illustrates a user interacting with a piece of paper;

FIGS. 8A and 8B illustrate mobile output displays as part of the user interaction;

A better understanding of the disclosed technology will be obtained from the following detailed description of the preferred embodiments taken in conjunction with the drawings and the attached claims.

DETAILED DESCRIPTION

Figure 1:
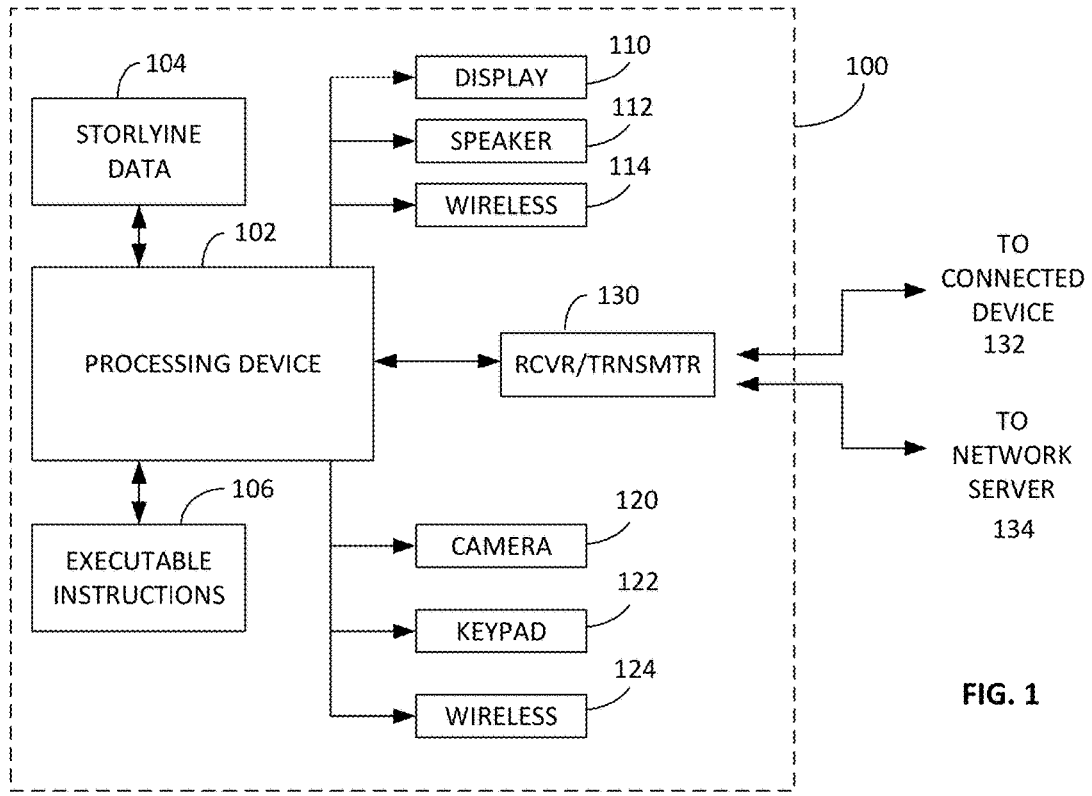
FIG. 1 illustrates a block diagram of a mobile computing device in accordance with one embodiment of the invention.

FIG. 1 illustrates a mobile computing device 100 including a processing device 102 and at least two data storage devices, one storing storyline data 104 and the other storing executable instructions 106.

The mobile computing device 100 includes output components, including for example but not limited to a display 110, a speaker 112, and a wireless (or wired) interface 114 for connecting to one or more external devices. The mobile computing device 100 additionally includes input components including for example but not limited to a camera 120, a keypad 122, and a wireless (or wired) interface 124 for receiving input from one or more peripheral devices. In one embodiment, the wireless (or wired) element 114 can be the same as element 124 or these interfaces can separate dedicated elements.

The mobile computing device 100 further includes a receiver/transmitter 130. Via this receiver/transmitter 130, device 100 communicates with connected devices 132 and/or network servers 134.

The mobile computing device 100 may be any suitable computing device capable of being mobile. In one embodiment, the device 100 may be a smartphone or tablet computer. In other embodiments, the device 100 can be a dedicated computing device providing functionality noted herein. In another embodiment, the device 100 can be a laptop or desktop computer. In another embodiment, the device 100 can be a gaming device or devices, such as for example a gaming console, television set-up box, gaming controller, gaming headset, or combination thereof.

The processing device 102 can be disposed within the mobile computing device 100 or can be disposed ancillary to the device 100. For example, if the mobile computing device 102 is a handheld gaming controller with wired or wireless communication to a gaming set-up box, the processing device 102 can be within the set-up box saving power consumption in the controller. By contrast, if the mobile computing device 100 is a mobile phone the processing device 102 is embedded therein.

The storyline data 104 and the executable instructions 106 are typically stored in a non-transitory storage such as one or more data storage devices. The data storage can be local to the processing device 102 and/or can be in a distributed environment.

The output elements, including for example the display 110, the speaker 112, wireless interface 114 can be local or external to the device 100. For example, with a smart phone or tablet computer, the display 110 can be the local touch-screen display on the device 100 and using the internal speaker(s) 112. By contrast, the mobile device may communicate with an external display, such as using a mirroring operation or wirelessly transmitting the output to a connected television. Here the connected television can be via the wireless interface 114 or can be interpreted as part of the display 110. Similarly, users may connect audio output to one or more external speakers, indicated as speakers 112. The output devices 110, 112, and 114 are not expressly limited as being internal to the mobile computing device 100 but can include external output device(s).

Similarly, the input elements, including for example, the camera 120, the keypad 122, and wireless interface 124 can be local or external to the device 100. The camera 120 can be the local camera included with the smartphone, tablet computer, gaming device, etc. The keypad 122 can be the touchscreen such as found in the smartphone or tablet computer or some gaming devices, the keypad 122 can also be a dedicated keypad such as found with some gaming controllers for example. Additionally, the input devices 120, 122, 124 can be external to the mobile device, for example a web cam connected to the computing device, or a camera or keypad associated with a second mobile computing device sending the image data to the processing device 102 for example. The input device 120, 122, and 124 are not expressly limited as being internal to the mobile computing device 100 but can be external input device(s).

The receiver/transmitter 130 can operate in accordance with known data transmission techniques for transmitting and/or receiving data. For example, the communication may be across wireless networking to a wireless router connected to an Internet connection. For example, the communication may be across a Bluetooth® or other local wireless communication channel. For example, the communication may be across a cellular network.

The receiver/transmitter 130 facilitates communication with a connective device 132 and/or a network server 134. As described in greater detail below, the connected device 132 can be another mobile computing device (similar to device 100), the connected device 132 can be a peripheral computing or gaming device, or other type of processing device or devices as recognized by one skilled in the art. The network 134 can be one or more network-based processing server or servers for cloud-based or distributed content management.

In one embodiment, the receiver/transmitter 130 can operate in real time with the execution of instructions 106 by the processing device 102. In another embodiment, the mobile device 100 can be disconnected from any external devices 132 and/or servers 134 and the receiver/transmitter 130 inoperative until communication can be facilitated.

The device 100 of FIG. 1 provides for the method and system for integrating physical items within computing interactions. Herein, the computing interactions include gameplay for progressing a storyline. A storyline is a sequence of conditional events facilitating the gameplay, the conditional events are based on a combination of external physical items, content capture via the mobile device, and user engagement of both the physical items and engaging in further gameplay activities.

Figure 2:
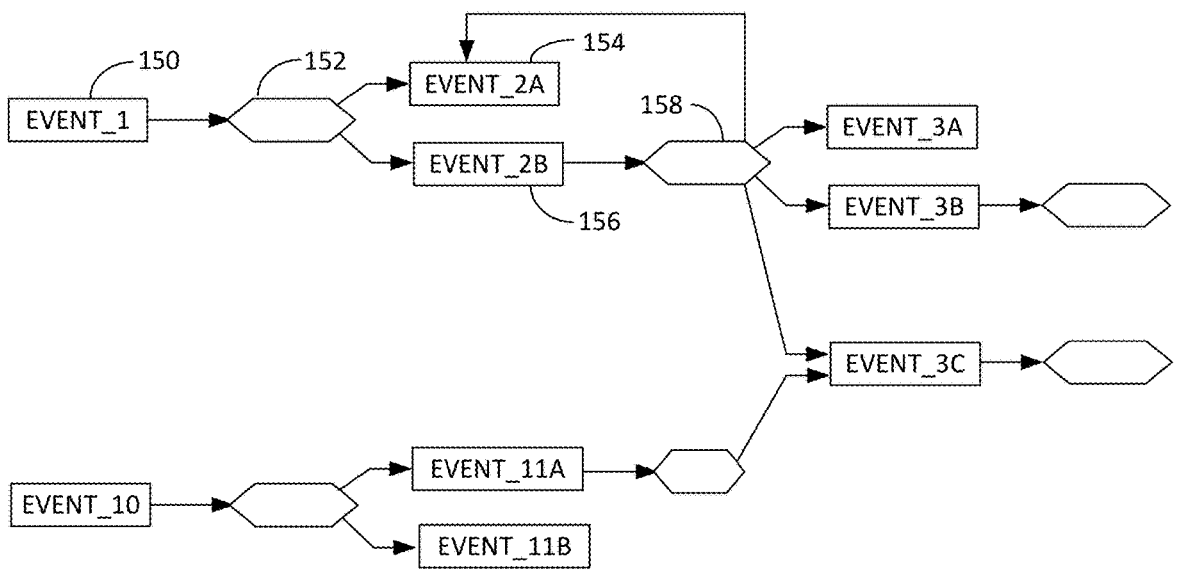
FIG. 2 illustrates a data flow diagram illustrating one embodiment of a storyline.

FIG. 2 illustrates a sample data flow operation of conditional events associated with a storyline. The FIG. 2 data flow is one exemplary illustration representing a much larger sequence of events, decisions, and interactions that translate into a storyline. While various activities of engaging the storyline may be performed by users engaging in gameplay, the method and system herein performs processing operations engaging with input and output devices for electronically facilitating the input and output processing that is visually translated into gameplay.

Progressing a storyline is a sequence of varying events based on conditions. FIG. 2 illustrates a sample first event 150 progressing to a conditional event 152. For example, the first event 150 can be an event occurring with the mobile computing device 100 of FIG. 1. By way of example, the event 150 can be an image capture of an particular physical item. As described in greater detail below, the image capture can be capturing an image or video of a physical game piece sitting on a physical board game.

Conditional event 152 can be image recognition of the physical game piece. The conditional event 152 can also operate based on conditional data fields associated with the gameplay, the event 150, and/or the content capture. For example, a conditional data field can be a character assigned to a particular user holding the mobile computing device. Different users playing different gaming characters, for example, can generate different or varying event outputs.

In one embodiment, user interfacing can include collecting or generating conditional events used for the gameplay. For example, conditional events may be assigning roles within the game, thus different users are designated for different roles. For example, conditional events may be based on pre-existing gameplay including authorization or certification for performing or engaging in various activities.

The above examples of conditional events are exemplary and not exclusive in nature, whereby conditional events can be any suitable data field or fields are recognized by a skilled artisan for advancing gameplay consistent with the present method and system.

In the FIG. 2 data flow example, event outputs of the conditional event 152 can be different second events, such as event 154 or event 156. For example, event 154 can be generating an output display on the mobile computing device with an augmented reality display illustrating gameplay content. For example, event 156 can be generating an audio output on the mobile device sharing audio content for advancing the storyline.

In the FIG. 2 example, event 154 can be a stop event ending the current storyline. For example, if the user, as the gameplayer, fails to acquire certain content, event 154 can indicate the storyline terminates until the condition is met. Conditions, for example, can be completing an earlier level, stage, adventure, task, acquiring a virtual item, acquiring a physical item, solving a puzzle, etc.

The FIG. 2 data flow continues from event 156 to the next conditional event 158. Iterations can include regressing to prior events, merging storylines between other events, and any other suitable sequence of story events. Illustrated in FIG. 2, the data flow operations provide for authoring storyline content based on events on conditions and conditional data fields associated with the gameplay. The data flow operations occur either within the processing device 102 and/or via connected device(s) 132 and/or network server(s) 134 of FIG. 1.

Figure 3:
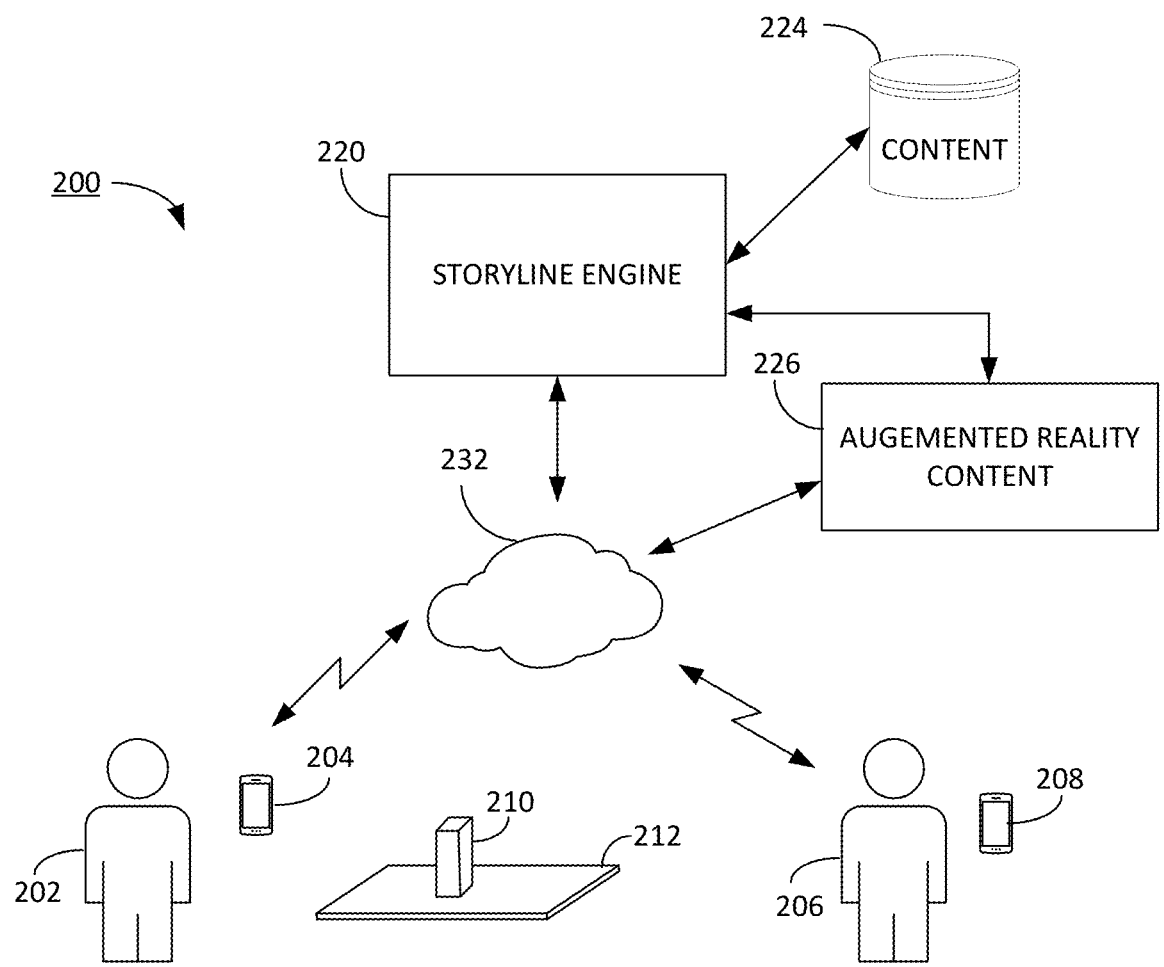
FIG. 3 illustrates a block diagram of a computing environment and processing systems providing for integrating physical items within computing interactions.

The present method and system can operate with a single processing device or with multiple devices. FIG. 3 illustrates one embodiment of a system 200 with a first user 202 having a first mobile device 204 and a second user 206 with a second mobile device 208. The users 202 and 206 engage a board 210 having at least one physical item 212 thereon.

During gameplay, the devices 204 and 208 interact with a network-based storyline engine 220 via a network connection 222, e.g. the Internet. In this embodiment, the storyline engine 220 progresses the storyline via interactions between the users 202, 206 and the board 210 and/or items 212. The storyline engine 220 processes various conditional events, such as events and conditional events exemplary listed in FIG. 2.

As part of the progressing the storyline, the engine 220 can access supplemental content, which can include audio, images, or any other suitable content progressing the storyline. In this embodiment, the content is stored in a content database 224.

As part of progressing the storyline, the engine 220 can additionally access augmented reality content. In this embodiment, an augmented reality content database 226 stores the augmented reality content.

The databases 224 and 226 can be in a shared server with the storyline engine 220 and/or can be distributed across one or more distributed storage locations.

The storyline engine 220, in progressing the storyline, can therein access the additional content from database 224 and/or database 226. The engine 220 can therein transmit this supplemental content back the mobile device 204 and/or mobile device 208. If the content is augmented reality content, the users 202 and/or 206 can via the augmented reality content as part of progressing the storyline. This augmented reality can be not only an output display for the user, but also the transition to the next event in the gameplay. Thus, here the augmented reality is not just an output but a functional element for next possible steps or actions with the computer interactions.

Similarly, the present method and system can operate across multiple processing devices, e.g. devices 204 and 206. In one embodiment the devices can be synchronized to display mirroring content. In another embodiment, event execution can be across different devices. For example, a first event can be performed by device 204, such as entering a clue or other text input. A second event can then be performed by device 206, either in response to the first event or a separate aspect of gameplay. With multiple processing devices, the gameplay and storyline advancement can be handed off between devices. Another embodiment with multiple devices allows for each device to be associated with a character in the game, thus an overall storyline can by synchronized by various users using different computing devices receiving input usable for determining events for advancing either character-specific storylines and/or an overall storyline.

The FIG. 3 processing system uses network-based connectivity. Operations of the method and system do not require network-based connectivity, rather in one embodiment the processing operations and data storage can be entirely local. Therefore, gameplay can be performed in an environment lacking wireless or network connectivity.

In one embodiment, data processing routines can be performed to monitor and track gameplay. These routines can be network-based and/or local base. The routines can capture gameplay statistics, including for far a user advances within a storyline and/or how long the user engages in the storyline. In one embodiment, these gameplay statistics can have an iterative benefit for content creators, for example determining a specific clue or sequence of events is too complicated if statistics indicate an abnormally slow segment of gameplay.

These gameplay statistics can be internally stored for user tracking. These gameplay statistics can be shared with other gameplay users. Statistics can be used to rate or rank players. In one embodiment, an output display can be generated indicating the gameplay statistics, available to the user individually or across a distributed environment. By way of example, one embodiment may include distributing a gameplay statistic across a social media platform indicating completion of a storyline chapter or segment and the statistics.

Figure 4:
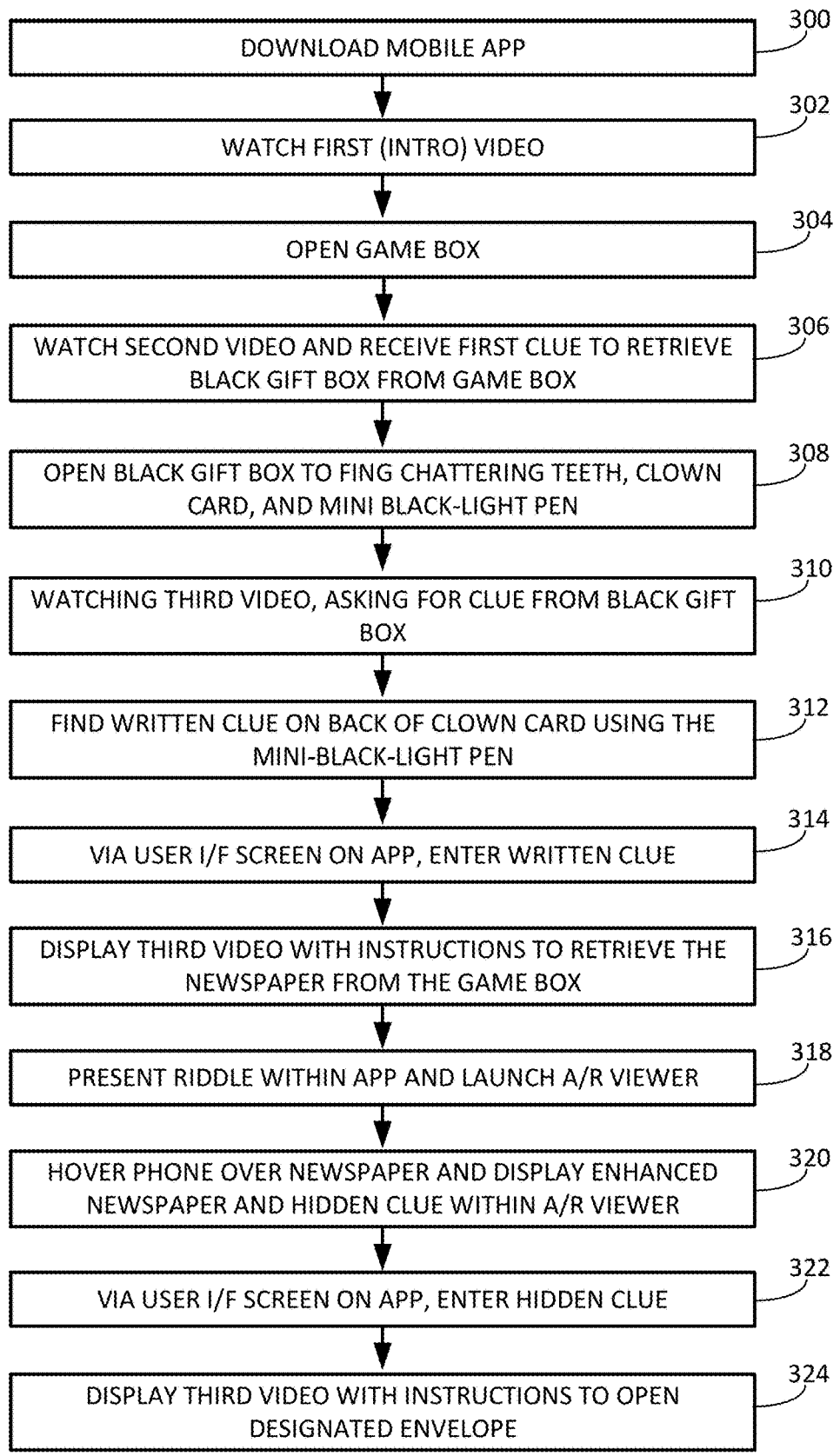
FIG. 4 illustrates a flowchart of the steps of one embodiment of a method for integrating physical items within a computing interaction.

In one embodiment of gameplay, FIG. 4 illustrates an exemplary embodiment for integrating physical items within a computing interaction. The methodology of FIG. 4 can be performed using the system and processing operations as noted above.

Step 300 is downloading a mobile app. This may be performed using any suitable technique, including accessing an application store or other online portal. In one embodiment, a user may use a visual (QR) code to access or otherwise download the application.

With the app downloaded and running locally on a phone or mobile device, step 302 is launching a first introduction video. The user watches the video, providing an introduction and some context to the upcoming storyline.

As part of the integration of physical items, the user receives physical items. One example is a packaged box included curated physical items. Step 304, the user opens the box to reveal its contents. In one embodiment, the first video in step 302 can include instructions for the user to manually open the box.

Step 306 is executing a second video, the user watching the second video running on the mobile device. The second video can include a first instruction relative to the box. For example, the instruction can be to remove a black gift box from the game box.

Step 308, the user removes the gift box, opens it up. Revealed inside the box is one or more physical items. In this example, the box may contain a set of chattering teeth, a small carboard card of a clown, and a mini black-light pen. Step 310, the user activates the playing of a third video on the mobile device. The video includes additional storyline content, concluding by asking for a clue to be acquired from the black gift box.

The user can then manually interact with gift box contents, eventually figuring out there is a hidden message written on the back of the card, visible only using the black-light pen, step 312. Within the mobile device, the app then launches a user interface screen with a keypad and a request for the user to enter the written clue, step 314. The user interface receives the text input.

When a select or enter button is pressed, the application then processes the textual input to determine if the input is correct and the user found the clue. If the textual input is incorrect, the user can be provided additional instructions to assist with finding the clue. In this embodiment, the storyline does not progress until the hidden clue is found on the card and properly entered into the application.

With entering a correct clue, step 316 is displaying a third video with instructions to retrieve a newspaper from the game box. In this gameplay, the newspaper appears like an actual newspaper, including being a publication relative to an existing city or region associated with the context of the storyline. By all outward appearances, the newspaper look likes any standard newspaper, in one embodiment. Other examples can include a magazine or other type of publication. In one embodiment the publication can be designed for the gameplay itself. In another embodiment, the publication can be a publication available to the public with an included image, article, or other content hidden in plain sight.

Step 318 is then displaying on the mobile device a visual and/or audible output with a riddle. For example, this can be an image or a video clip. In this embodiment, with the riddle, the user can be presented a button or other interface element to launch an augmented reality viewer. In another embodiment, the augmented reality viewer can be automatically launched within the application.

Step 320, the user determines solving the riddle requires interacting the mobile phone and augmented reality viewer with the newspaper. In this example, hovering the phone over the newspaper displays an enhanced newspaper with a clue only visible in the augmented reality viewer.

Step 322, the user then progresses the application to a user interface screen and enters the hidden clue found from the augmented reality viewer. Once the data entry is determined as correct, step 324 is to display a third video with instructions to open a specifically designated envelope.

The gameplay continues to advance with additional outputs on the mobile device, interacting with physical items. In this example, the contents of the game box are curated for facilitating the completion of the storyline. The game box can be, in one embodiment, a chapter of the storyline. Additionally game boxes then further progress the storyline.

The method and system progresses the storyline via user interactions with physical items, these interactions translated or captured and processed by the mobile application. The storyline is a series of conditional events, for example one event is determining a person has successfully found a clue hidden on an item. When this existing event is determined, the event output can be audio and video output that furthers the storyline, including launching the augmented reality viewer.

In the FIG. 4 exemplary embodiment, a conditional data field can be if the user enters a correct clue as acquired from the items in the black gift box. The next event can be launching the augmented reality viewer and then generating an augmented reality output display when the user hovers the phone over the printed document.

Figure 5:
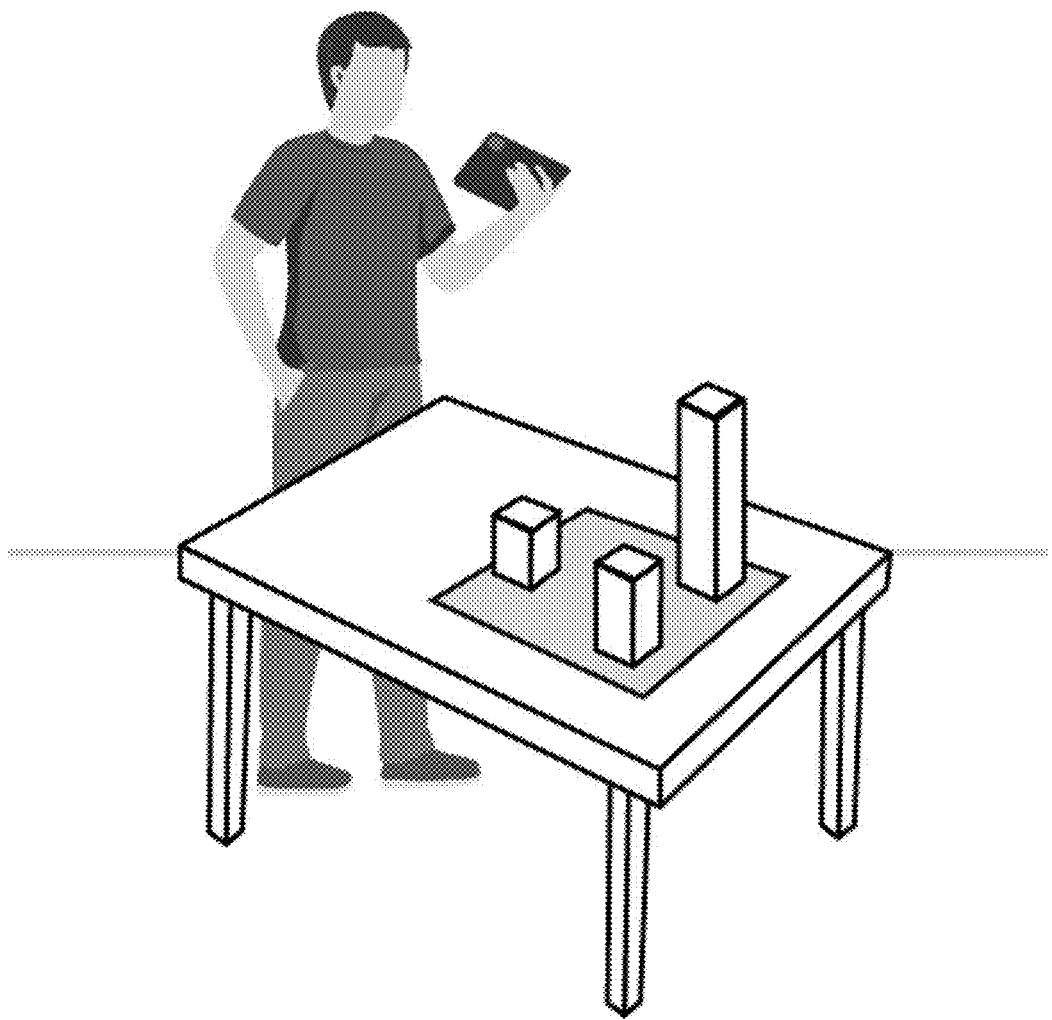
FIG. 5 illustrates a user interacting with game pieces.

FIG. 5 illustrates one exemplary embodiment of user interaction, including the user holding a mobile computing device and using a camera function to image capture several game pieces on a table. In this example, the game pieces can be blocks of varying sizes positioned on a sheet of paper. The mobile computing device can be executing the mobile application and running the viewing application. The user interaction can be prior to gameplay, for example a calibration step, can be the beginning of gameplay or can be additional or continued steps of gameplay.

Figure 6A:
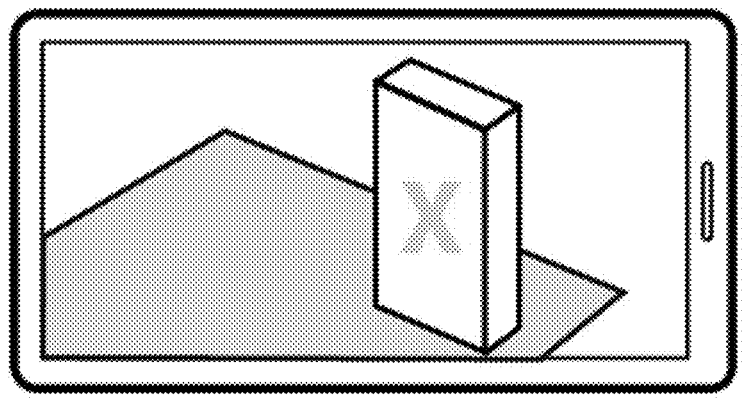
FIGS. 6A and 6B illustrate mobile output displays as part of the user interaction.

In the FIG. 5 example, the three game pieces are blocks. FIG. 6A illustrates a sample screenshot viewable on the mobile computing device. In this case the block may include a visible element thereon. In FIG. 6A, this is illustrated as a representative letter X but can be any suitable element, including a logo, design, text, etc.

Figure 6B:
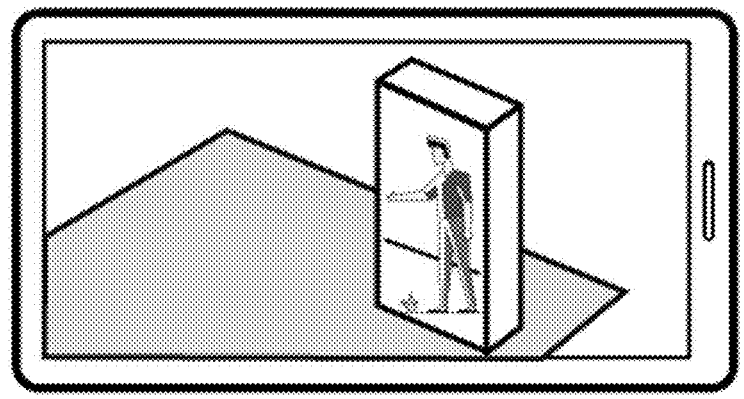

Using the application on the mobile computing device, FIG. 6B illustrates a sample screenshot of the interactive augmented reality display. In FIG. 6B, the X is replaced with visual content. In this example, visual content is an image of gameplay character. The interactions using the application can be part of the storyline as described herein. For example, recognition of the block may be a conditional event, the image may be a clue or next element as part of the interactive series of operations for progressing the storyline. For example, the image may be interactive and tell a story or give a clue for advancing the storyline.

FIG. 7 illustrates another sample interactive integrating physical items. Here, the physical item is a paper or other printed object with a designated pattern. This sample pattern is a grid laid out on a piece of paper. The user scans or otherwise captures an image of the paper using the mobile computing device. While capturing the image, the device is executing the application for progressing the storyline.

FIG. 8A is an illustration of the screen display of the captured content. Here, the paper with the grid is visible in the screen. FIG. 8A illustrates the image capture prior to augmented reality or other supplemental display. FIG. 8B illustrates a cave where the paper was. In this embodiment, the display of the cave is an output operation providing for generating the interactive series of operations. This cave can be part of the storyline with existing or conditional events associated with the cave. Via the executable software, the user can then interact with the output display, for example enlarging the view of the cave to view elements inside the cave.

Figure 9:
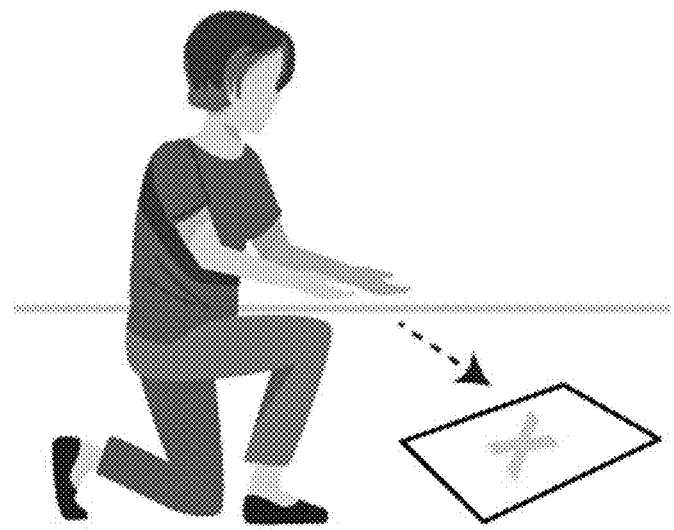
FIG. 9 illustrates a user interacting with an object on the floor.
Figure 10A:
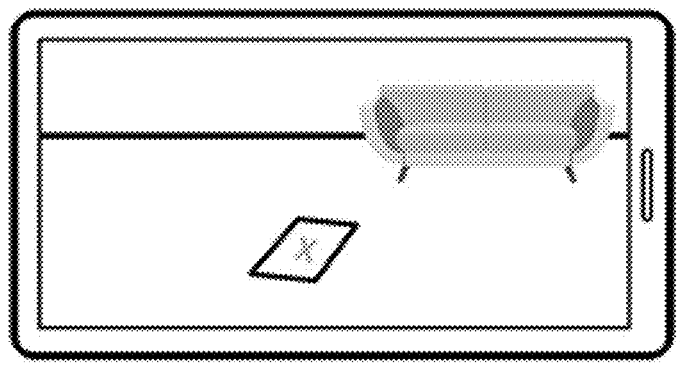
FIGS. 10A and 10B illustrate mobile output displays as part of the user interaction.

FIG. 9 illustrates another embodiment of user interaction. In this example, the user can lay a paper with a marking on the ground. In FIG. 10A, the image capture shows the paper, herein the middle of a room. Using the executable software and the image capture and data processing functions, the interaction can translate the flat paper into a virtual room.

Figure 10B:
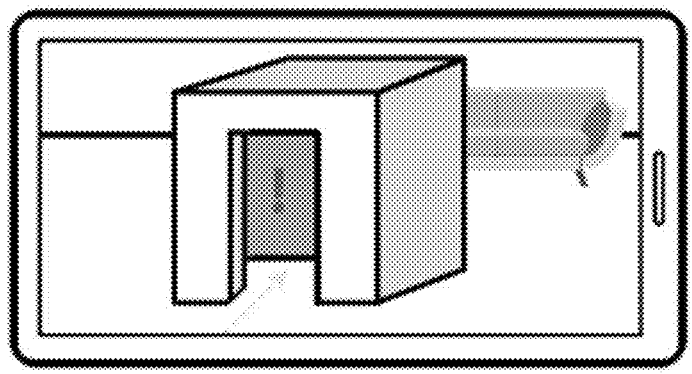

FIG. 10B illustrates an example output display of transforming the flat paper into a vault. Further interactions are then possible using the executable software and conditional events. These interactions further progress the storyline. For example, the vault may include a look on the outer door and the user must determine a combination of numbers and/or letters to open the door. These interactions use event data, including for example event output data of the visual representation of the vault and audio data for interactions with the lock assembly.

Where the above examples include an augmented reality with a newspaper, advancement of the storyline can use any other suitable type of augmented reality. For example, a collection of physical items can be a board game with carboard structures representing buildings, an augmented reality showing the game board come to live with a full cityscape and character interactions within the augmented reality display.

From a data processing level, the method and system integrates physical items using the mobile device as a medium for computing interactions. The interactions can be manual user manipulation of items to acquire information used as data entry received by the mobile device. The interactions can be electronically generated interactions based on the mobile device processing inputs, such as visual image or content capture or audio input, for example. The method and system uses the data processing operations and conditional data fields for progressing the storyline via not only additional input but generating output as gameplay content.

In addition to integrating physical items, the method and system can facilitate gameplay based on the physical environment. In one embodiment, a user may scan the room prior to beginning gameplay, photogrammetry engines or other processing operations may detect physical items within the environment, e.g. sofa, chair, bookshelf, etc. The storyline and conditional events can reference the physical items in the room. For example, one gameplay event can be to look behind a specific item for a character, e.g. try to catch the bad guy behind the couch. The user can then record looking behind the couch with an A/R viewer giving a video overlay of the bad guy being spotted in the designated location.

The A/R viewer allows for an improved degree of interaction and gameplay. In one embodiment, A/R interaction can facilitate scaling. For example, the physical item may be a single envelope. When scanned with the A/R viewer, the envelope can then expand to be a full room, for example a bank vault where further elements of the storyline occur.

The present method and system further operates for any variety of gameplay and additional creator content. The gameplay content, including conditional events and event outputs are data points as processed by one or more processing devices. For example, if a content creator seeks to modify gameplay or additional gameplay content, this content can be uploaded and stored on the network devices 220, 224, and 226 of FIG. 3.

Updated content can include two variations: additional storyline elements with interactions and outputs; and physical items. With the additional storyline elements, this can include new or update data fields for the storyline engine 220 of FIG. 3. This updated content can include additional conditional data fields for advancing the storyline. For augments reality content, this can include data provided for overlay. The content 224 stored in database 224 can similarly be updated.

For replacing content, content creators can generate new visual and auditory content, uploaded and integrating into the storyline engine. For new content, content creators can add this content to the existing repository.

For physical items, content creators can generate new physical items for distribution to users. Concurrent with physical items, the FIG. 3 back-end system includes updates to the engine 220 for recognizing and using the physical items. For example, new physical items may include additional clues for user input via a data entry screen. For example, new physical items may be subject to augmented reality overlay display.

In one embodiment, physical items can be interchanged using a software processing routine executable by the processing device 102 of FIG. 1. For example, if a user loses a game piece or a gaming element is omitted from distribution to a user, a processing routine can recognize a new item and execute a substitution operation. For example, the original physical item may be a figurine of a gaming character. The figurine was usable for placing on a board and the augmented reality viewer generates an augmented reality view of the character virtually coming to life.

If the figurine is not available, a picture of the gaming character can be substituted. A substitution processing routine includes pre-existing data points of what the original physical item is supposed to look like. These pre-existing data points are used for data recognition operations. The substation processing routine can include a user input indicating the original item is not available for to be substituted. From there, a content capture of the replacement is acquired. In one example, the phone camera is used to video of the item from different angles. Image processing routines can then generate new data points forming a recognition of the replacement item. At a data processing level, the replacement item data points are then substituted for the original item, such that user interactions designated for the original item are processed using the replacement item.

Gameplay uses conditional events for progressing the storyline. Conditional events can be internal to the gameplay, for example user-generated events noted above of finding a hidden clue and entering it in a user interface screen. Additionally, conditional events can be time-based events, e.g. relating to an external or global time. For example, a storyline can include an event occurring a present time or date. In the computing interactions, the specific time can be a conditional event for effecting user interaction. For example content and gameplay interactions becoming available after a set time, such as a timed content release. For example, a level or chapter in a storyline can be tied to an external event such as a movie launch, book publication, television show release, etc., the additional content made available to tie into this external content. For example, users reaching a certain level in a storyline can receive time-based or extra gameplay content such as a mini-game or storyline only available for a 24 window.

The present method and system, based on the storyline and conditional events, further provides for repeatability of gameplay by modifying one or more of the conditional events and generated outputs. Moreover, aspects of storylines can be re-used by integrating new or substituting physical items and then modifying the storyline to account for the different items.

In addition, users can establish profiles or other gameplay characteristics. Where the above describes general user interaction and gameplay, a further embodiment can include a profile of the user, stored locally and/or on the network. Profile data can relate to one or more of the users and include information not only one current gameplay activities, but historic gameplay.

The profile data can be integrated into gameplay and translated between storylines, such as across different chapters of an existing story or entirely different stories. The profile data can also be collected and shared across one or more social distribution platforms. One embodiment may include livestream gameplay activities or segments of gameplay, for example if gameplay includes the user recording the performing a task or sequence of activities, that video can be distributed across one or more content platforms including the user profile data.

Along with profile data, users can retain customizations not only to their characters or identities, but also to their gameplay. For example, if users purchase or win game-based characteristics, these characteristics can be stored as part of the profile. In one example, a user may acquire game characteristics for completing challenges or prior games. In another example, a user may acquire game characteristics through the purchase or acquisition of physical items or completing real-world events. By way of example, if the storyline relates to a movie, the user can acquire game characteristics by scanning a code indicating having seen either the movie or a preview of the movie.

Customizations for gameplay can be based on any number of additional factors. In one embodiment, users may collect trading cards that can indicate customization factors. For example, for a gameplay character there may be different versions of the character from different media, comic books, television shows, movies, graphic novels, video games, etc. The user may have a trading card or a customization card indicating a particular character version. In one embodiment an image capture of the card can be used to generate the character customizations not only stored as part of the user profile, but also used for generating output gaming content. Other examples can include but are not limited to clothing type, hair color, hair style, skin color, etc.

Noted examples above include capturing content of physical items and using augmented reality viewers, but these examples are not limiting examples. Further user interactions with physical items can captured and processed as part of progressing the storyline. For example, one embodiment may include capturing video of the user directly interacting, which may be with or without a gaming item. For example, video capture may be of a user performing a sequence of moves, such as a dance move, or holding a sign, creating a drawing consistent with gaming instructions, etc.

Therefore, one embodiment can include the processing device receiving a video recording user interactions as a part of the event data. The processing device can use the video recording as a conditional event. The processing device can also use the video recording as output integrated with a graphical representation based on a later event. For example, if the user records a video doing a dance sequence, that recording can be added to a video overlay with flashing lights and other graphics as background imagery.

In addition to gameplay for a specific storyline, a sequence of storylines can define a campaign. The campaign can be broken down into segments or chapters. For example, a new chapter can be distributed every defined time period, e.g. one chapter per month. The chapter can include new or additional physical items and sequencing the storyline consistent with the techniques described herein.

In one embodiment, the application on the mobile device and/or an application running on a network server, can track campaign management. This campaign management can include how the user or users progress through the individual storylines, but also how they progress through the overall campaign. This can include storying characteristic data for individual players, but also capturing and recording gameplay statistics.

Gameplay statistics can be any data points relative to gameplay. For example, these can include number of players, length of play, completion of different campaign scenarios, errors in gameplay, etc.

In one embodiment, a network-based application can review the gameplay statistics to modify gameplay for future iterations. For example, if statistics indicate complications at a specific level or event, the difficulty level can be lowered to improve the flow of gameplay. Review and modification of gameplay can be either global or individual to a specific storyline. For example, if statistics indicate a current user cannot clear a specific challenge, gameplay modifications can be generated in real-time or near real-time to prevent the user from discontinuing gameplay out of frustration.

In another embodiment, utilization of the A/R technology as part of the gameplay sequence can be used for feedback factors acquired from users actively engaging in gameplay. For example, capturing user gameplay is usable for receiving feedback. In one embodiment, users can record themselves interacting with physical gameplay elements and virtual gameplay elements. Here, users can provide dynamic feedback of the gameplay. This feedback can be captured for iterating gameplay as noted above. This feedback can also be captured for social media distribution, such as sharing gameplay interactions.

Figure 11:
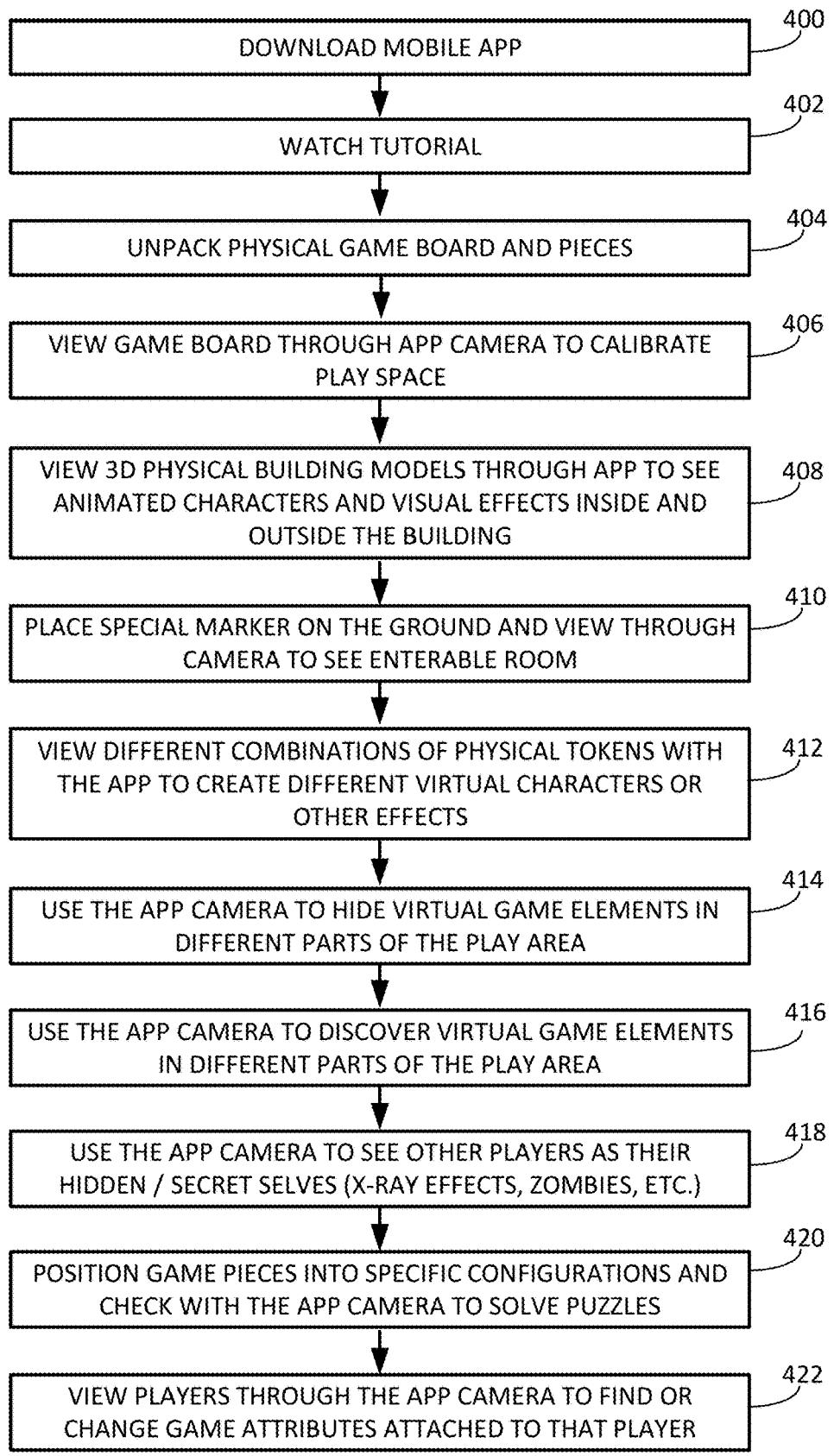
FIG. 11 illustrates a flowchart of method steps for further gameplay interactions.

FIG. 11 illustrates one embodiment of a methodology for interacting with physical items using the disclosed processing operations. Step 400 is downloading the mobile app. For example, a player may access an online app store and download the executable application. In another example, the player may scan a QR code or other visual item, scanning directing the mobile device to a network location for downloading the mobile app. As part of step 400, the mobile app is downloaded and then executed on the mobile device.

Step 402 is watching a tutorial relating to the mobile application and gameplay. This tutorial can be an executable video within the mobile application. In another embodiment, the tutorial can be a video accessible via a video distribution platform. In another embodiment, the tutorial can be a combination of video, audio, and interactions using the mobile application, allowing the user to practice the gameplay interactions using the mobile device.

Step 404 is unpacking the physical game board and pieces. In this embodiment, the user is presented with a box and a variety of game elements inside.

Step 406 is viewing the game board through the app camera to calibrate play space. This method step includes functional operations performed by the processing device in the mobile device in response to executable instructions. The calibration can include accounting for lighting, sizing, and other environmental factors.

The calibration can include image or video capture of designated items and modifying processing routines based on the captured image or video relative to preset or known conditions. One example may be a color or color palate, indicating lighting and camera resolution. The calibration can include detecting a size of a room or area where gameplay is to occur and calibrating of elements to be displayed, for example such as buildings or rooms later-displayed in the AR interaction.

Step 408 is view 3D physical building models through the application to see animated character and visual effects inside and outside the building. These visual effects can be part of the storyline. The storyline provides for progressing gameplay through interactions with both physical items and conditional events relating to input and output operations.

In this exemplary embodiment, an AR display can show a building and see characters. The actions of the characters can be part of the storyline, including elements for telling stories, as well as offering hints or clues for future gameplay events or input data as generated by the user.

Step 410 is to place special markers on the ground and view through the camera to see enterable room. In one example, FIG. 9 illustrates placing a special marker of a card or poster with a designated marking, and FIG. 10B illustrates the screenshot AR display of a building visible in the place of the marker. For example, the room can be a bank vault and the user can view the interior of the bank vault through the AR display. For example, the room can be a police station jail cell and the user can view individual characters being housed within the jail cell.

Step 412 is viewing different combinations of physical tokens with the app to create different visual characters or other effects. As described above, this can include for example viewing a figurine as a physical token and viewing a full-size replication of the character within the AR display. The present method and system can use any suitable type of token capable of being recognized by the mobile computing device and the software translation or converting the token into a virtual AR representation as part of the storyline.

Step 414 is using the app camera to hide virtual game elements in different parts of the play area. In this example, interactions with the AR display can include recognizing user interactions within a physical space being translated into a representation within the AR space. The user can control virtual game elements and hide them within the virtual game space. Executable software therein recognized or detects the placement of tokens within the virtual space, including logging or otherwise tracking the placement locations. Having this placement knowledge allows for later interactions with hidden elements by the player or other players during gameplay.

Step 416 is using the app camera to discover virtual game elements in different parts of the play area. Here, for example, one user may hide items and other users then search and find these items within the virtual play area. This includes interactions through the mobile application and AR viewer technology. This can additionally include server-based or local-based information storage and/or tracking for knowing where item(s) are stored and when other users have located said item(s).

Step 418 is using the app camera to see other players as their hidden/secret selves. For example, one for of gameplay can include competing players taking on a hidden or cloaked position within the gameplay area. As various users interact within the gameplay area via the AR interface running on the mobile device, the application camara can include overlay or processing functions to see other players. In one embodiment, this functionality can include data sharing operations between different mobile applications via networked or shared communication. For instance, if player A is in a first position but cloaked, the mobile computing device of player B will know player A's presence by receiving position information from the mobile interface of player A.

Step 420 is to position game pieces into specific configurations and check with the app camera to solve puzzles. This interaction can be part of the conditional events relating to input and output operations. The app camera can view and process image data of the configurations, translating that knowledge into actionable processing operations. These processing operations can include data comparison operations executing locally and/or network-based, including advancing the storyline if the configuration is correct and supplementing content if the configuration is incorrect, e.g. providing another hint or clue.

Step 422 is view players through the app camera to find or change game attributes attached to that player. In this embodiment, the application may include a general baseline AR content display. The user can modify a view factor that changes the AR output. In another embodiment, the game attribute can include a difficulty factor, for example making puzzles easier or possibly harder. In one embodiment, game attributes attached to the player can be locally-stored settings. In one embodiment, game attributes can be network-based, such as stored in a central platform. In one embodiment, game attributes can be earned or purchased and thus owned or otherwise retained by the player, such as a special outfits for characters or other types of modifications.

As part of the gameplay and AR functionality, the computing system can further provide for world-building within the AR environment. The method and system uses the underlying AR interactivity for initiating the interactions. These may include a token or marker for generating a larger element, such as a room or building or other structure illustrated in FIG. 10B.

As part of the interaction, the user(s) can then interact with the structure, including adding or modifying content within the environment, including operations as noted in FIG. 11 above. These can include building virtual worlds for user interactions, interactions by both the original user and by other users invited to enter the virtual space. For example, the user may create a virtual playroom for interacting with gameplay characters, other users allowed to enter in and interact. In another embodiment, a user can create and store content over an extended period of time, a virtual vault or storage location for gameplay elements. These operations include app functionality for AR interactions, but also storing content items, token, location data, and other data points associated with the user and/or the virtual space. These data points are then accessible for later interactions using the mobile app or another mobile app granted access to the virtual space.

FIGS. 1 through 11 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. As used herein, executable operations and executable instructions can be performed based on transmission to one or more processing devices via storage in a non-transitory computer readable medium.

What is claimed is:

1. A computerized method for integrating physical items within a computing interaction, the method comprising:
   executing an application on a mobile computing device, the application including executable software instructions for progressing a storyline via interactions with at least one user and a plurality of physical items external to the mobile computing device, wherein the storyline is a plurality of conditional events relating to input and output operations for generating an interactive series of operations between the at least one user and the application;
   receiving content creator input data relating to the storyline;
   determining input data relating to an existing event, the existing event occurring in relation to the storyline;
   accessing event output data based at least on the input data and presenting the event output data to the at least one user, the event output data including at least one of an audio output and a video output;
   receiving visual content data captured by a camera associated with the mobile computing device, the visual content data includes digital imagery of at least one of the plurality of physical items;
   processing the visual content data in relation to the storyline including accessing a data storage element having at least one conditional data field relating to the visual content data in relation to the existing event;
   integrating the content creator input data with the storyline via additional conditional data fields;
   storing the additional conditional data fields in the data storage element;
   electronically determining a next event in the storyline based on the processing of the visual content data; and
   generating and displaying an augmented reality output display integrated with the digital imagery of the at least one of the plurality of physical items via the mobile computing device based on the next event.

2. The method of claim 1 further comprising:
   presenting as the event output data a visual display of a graphical representation of a game board, the graphical representation of the game board based at least in part on an identification of at least one object identified with the visual content data.

3. The method of claim 1, wherein the conditional data fields include at least one of: time-based events and user-generated events.

4. The method of claim 3, wherein the time-based event is a conditional event including the conditional data fields associated with storyline occurring at a predetermined time.

5. The method of claim 1, wherein a visual code is embedded with the digital imagery such that the processing of the visual content data triggers one or more of the conditional data fields for determining the next event in the storyline.

6. The method of claim 1, the application being a first application and the mobile computing device being a first mobile computing device, the method further comprising:
   executing a second application on a second mobile computing device;
   via a networked communication, communicating between the first application and the second application; and
   generating the next event for execution on the second mobile computing device.

7. The method of claim 6 further comprising:
   handing off execution of the storyline from the first computing device to the second computing device.

8. The method of claim 6 further comprising:
   synchronizing execution of the storyline via both the first computing device and the second computing device.

9. The method of claim 8 wherein the first computing device executes the first application and the storyline via a first user perspective and the second computing device executes the second application and the storyline via a second user perspective.

10. The method of claim 1, wherein the next event in the storyline includes unlocking additional storyline modules including additional conditional events relating to the input and output operations.

11. The method of claim 1 further comprising:
    generating gameplay statistics based on the execution of the application on the mobile computing device; and
    generating an output display of the gameplay statistics for the at least one user.

12. The method of claim 1 further comprising:
    receiving a video recording of the at least first user interacting with the output based on the next event; and
    integrating the video recording with a graphical representation of the output based on the next event.

13. A system for integrating physical items within a computing interaction, the system comprising:
    a computer readable medium having executable instructions stored therein;
    a camera;
    an output device;
    at least one processing device, the at least one processing device, in response to the executable instructions, operative to:
    executing an application for progressing a storyline via interactions with at least one user and a plurality of physical items external thereto, wherein the storyline is a plurality of conditional events relating to input and output operations for generating an interactive series of operations between the at least one user and the application;
    determining input data relating to an existing event, the existing event occurring in relation to the storyline;
    accessing event output data based at least on the input data and presenting the event output data to the output device, the event output data including at least one of an audio output and a video output;
    receiving visual content data captured by the camera, the visual content data includes digital imagery of at least one of the plurality of physical items;
    processing the visual content data in relation to the storyline including accessing a data storage element having at least one conditional data field relating to the visual content data in relation to the existing event;
    electronically determining a next event in the storyline based thereon; and
    generating and displaying an augmented reality output display on the output device integrated with the digital imagery of the at least one of the plurality of physical items via the mobile computing device based on the next event; and
    at least one content storage device disposed on a network storage location, the content storage device in networked communication with the at least one processing device, the content storage device receiving content creator input data relating to the storyline and integrating the content creator input data with the storyline via additional conditional data fields.

14. The system of claim 13, the processing device further operative to present, as the event output data, a visual display of a graphical representation of a game board, the graphical representation of the game board based at least in part on an identification of at least one object identified with the visual content data.

15. The system of claim 13, wherein the conditional data fields include at least one of: time-based events and user-generated events.

16. The system of claim 13, wherein a visual code is embedded with the digital imagery such that the processing of the visual content data triggers one or more of the conditional data fields for determining the next event in the storyline.

17. The system of claim 13 further comprising:
a first mobile computing device having a first processing device disposed therein, the first processing device is one of the least one processing devices; and
a second mobile computing device having a second processing device disposed therein, the second processing device, via a networked communication with the first mobile computing device, executing a second application and generating the next event thereon.

18. The system of claim 17, wherein via communication between the first mobile computing device and the second mobile computing device, the system includes handing off execution of the storyline from the first mobile computing device to the second mobile computing device.

19. The system of claim 13, wherein the next event in the storyline includes unlocking additional storyline modules including additional conditional events relating to the input and output operations.

20. The system of claim 13, the processing device further operative to:
generate gameplay statistics based on the execution of the application; and
generate an output display of the gameplay statistics for the at least one user.

21. The system of claim 13, the processing device further operative to:
receive a video recording of the at least first user interacting with the output based on the next event; and
integrate the video recording with a graphical representation of the output based on the next event.

22. A computerized method for integrating physical items within a computing interaction, the method comprising:
executing an application on a mobile computing device, the application including executable software instructions for progressing a storyline via interactions with at least one user and a plurality of physical items external to the mobile computing device, wherein the storyline is a plurality of conditional events relating to input and output operations for generating an interactive series of operations between the at least one user and the application;
determining input data relating to an existing event, the existing event occurring in relation to the storyline;
accessing event output data based at least on the input data and presenting the event output data to the at least one user, the event output data including at least one of an audio output and a video output;
receiving visual content data captured by a camera associated with the mobile computing device, the visual content data includes digital imagery of at least one of the plurality of physical items;
processing the visual content data in relation to the storyline including accessing a data storage element having at least one conditional data field relating to the visual content data in relation to the existing event;
electronically determining a next event in the storyline based thereon;
generating and displaying an augmented reality output display integrated with the digital imagery of the at least one of the plurality of physical items via the mobile computing device based on the next event;
transmitting at least one mobile storyline module to the mobile computing device; and
processing additional visual content data in relation to the at least one mobile storyline module, wherein the mobile computing device is not in wireless communication with a network-based computing server.

23. A computerized method for integrating physical items within a computing interaction, the method comprising:
executing an application on a mobile computing device, the application including executable software instructions for progressing a storyline via interactions with at least one user and a plurality of physical items external to the mobile computing device, wherein the storyline is a plurality of conditional events relating to input and output operations for generating an interactive series of operations between the at least one user and the application;
determining input data relating to an existing event, the existing event occurring in relation to the storyline;
accessing event output data based at least on the input data and presenting the event output data to the at least one user, the event output data including at least one of an audio output and a video output;
receiving visual content data captured by a camera associated with the mobile computing device, the visual content data includes digital imagery of at least one of the plurality of physical items;
receiving input command that a first physical item is not available for capturing an image thereof;
receiving a second image of a second physical item; and
instructing the application on the mobile computing device for treating the second physical item as equivalent of the first physical item;
processing the visual content data in relation to the storyline including accessing a data storage element having at least one conditional data field relating to the visual content data in relation to the existing event;
electronically determining a next event in the storyline based thereon; and
generating and displaying an augmented reality output display integrated with the digital imagery of the at least one of the plurality of physical items via the mobile computing device based on the next event.

24. A system for integrating physical items within a computing interaction, the system comprising:
a computer readable medium having executable instructions stored therein;
a camera;
an output device;
at least one processing device, the at least one processing device, in response to the executable instructions, operative to:

executing an application for progressing a storyline via interactions with at least one user and a plurality of physical items external thereto, wherein the storyline is a plurality of conditional events relating to input and output operations for generating an interactive series of operations between the at least one user and the application;

determining input data relating to an existing event, the existing event occurring in relation to the storyline;

accessing event output data based at least on the input data and presenting the event output data to the output device, the event output data including at least one of an audio output and a video output;

receiving visual content data captured by the camera, the visual content data includes digital imagery of at least one of the plurality of physical items;

processing the visual content data in relation to the storyline including accessing a data storage element having at least one conditional data field relating to the visual content data in relation to the existing event;

electronically determining a next event in the storyline based thereon; and generating and displaying an augmented reality output display on the output device integrated with the digital imagery of the at least one of the plurality of physical items via the mobile computing device based on the next event; and a wireless receiver, wherein the processing device processing device is operative to:

receive at least one mobile storyline module; and process additional visual content data in relation to the at least one mobile storyline module, wherein the wireless receiver is not in wireless communication with a network-based computing server.

25. A system for integrating physical items within a computing interaction, the system comprising:

a computer readable medium having executable instructions stored therein;

a camera;

an output device;

at least one processing device, the at least one processing device, in response to the executable instructions, operative to:

executing an application for progressing a storyline via interactions with at least one user and a plurality of physical items external thereto, wherein the storyline is a plurality of conditional events relating to input and output operations for generating an interactive series of operations between the at least one user and the application;

determining input data relating to an existing event, the existing event occurring in relation to the storyline;

accessing event output data based at least on the input data and presenting the event output data to the output device, the event output data including at least one of an audio output and a video output;

receiving visual content data captured by the camera, the visual content data includes digital imagery of at least one of the plurality of physical items;

processing the visual content data in relation to the storyline including accessing a data storage element having at least one conditional data field relating to the visual content data in relation to the existing event;

receiving an input command that a first physical item is not available for capturing an image thereof;

receiving a second image of a second physical item; and treating the second physical item as equivalent of the first physical item;

electronically determining a next event in the storyline based thereon; and generating and displaying an augmented reality output display on the output device integrated with the digital imagery of the at least one of the plurality of physical items via the mobile computing device based on the next event.

* * * * *